United States Patent
Fujii et al.

(10) Patent No.: US 7,178,825 B2
(45) Date of Patent: Feb. 20, 2007

(54) VEHICLE AIR BAG DOOR

(75) Inventors: Mutsuo Fujii, Hiroshima (JP);
Tomonori Tanaka, Hiroshima (JP);
Mamoru Maruyama, Hiroshima (JP)

(73) Assignee: Nishikawa Kasei Co., Ltd., Hiroshima (JP)

( * ) Notice: Subject to any disclaimer, the term of this patent is extended or adjusted under 35 U.S.C. 154(b) by 265 days.

(21) Appl. No.: 10/684,188

(22) Filed: Oct. 10, 2003

(65) Prior Publication Data

US 2004/0075251 A1    Apr. 22, 2004

(30) Foreign Application Priority Data

Oct. 15, 2002  (JP)  .............................. 2002-300469
Feb. 24, 2003  (JP)  .............................. 2003-045725

(51) Int. Cl.
*B60R 21/20* (2006.01)
(52) U.S. Cl. .................................. 280/728.3; 280/732
(58) Field of Classification Search ............. 280/728.3, 280/732
See application file for complete search history.

(56) References Cited

U.S. PATENT DOCUMENTS

| | | | | |
|---|---|---|---|---|
| 5,564,731 A * | 10/1996 | Gallagher et al. | ........ | 280/728.3 |
| 5,779,262 A * | 7/1998 | Totani et al. | ............. | 280/728.3 |
| 5,902,428 A | 5/1999 | Gallagher et al. | | |
| 6,145,871 A | 11/2000 | Davis, Jr. et al. | | |
| 6,460,880 B1 * | 10/2002 | Gallagher et al. | ........ | 280/728.3 |
| 6,467,800 B1 * | 10/2002 | Bey et al. | ................. | 280/728.3 |
| 6,467,801 B1 | 10/2002 | Preisler et al. | | |
| 6,595,543 B2 * | 7/2003 | Desprez | .................... | 280/728.3 |
| 6,929,280 B2 * | 8/2005 | Yasuda et al. | ........... | 280/728.2 |
| 2002/0003343 A1 | 1/2002 | Kansteiner | | |
| 2004/0026902 A1 * | 2/2004 | Yasuda et al. | ........... | 280/728.2 |
| 2006/0131844 A1 * | 6/2006 | Trevino et al. | .......... | 280/728.3 |

FOREIGN PATENT DOCUMENTS

| | | |
|---|---|---|
| DE | 199 984 A1 | 3/2001 |
| EP | 0 968 889 A1 | 1/2000 |
| EP | 1 199 228 A1 | 4/2002 |
| JP | 11-129852 | 5/1999 |
| JP | 2000-071924 A | 3/2000 |
| JP | 2001-88647 | 4/2001 |
| JP | 2001-294114 A | 10/2001 |
| WO | WO 99/15369 | 4/1999 |

* cited by examiner

*Primary Examiner*—Paul N. Dickson
*Assistant Examiner*—Drew J. Brown
(74) *Attorney, Agent, or Firm*—Nixon Peabody LLP; Donald R. Studebaker

(57) ABSTRACT

An inventive vehicle air bag door includes a back-up member 13 provided on the bottom side of a panel main body 1. The back-up member 13 includes a back-up section 27, a plate section 20 and a hinge section 24 which are integrally formed. The hinge section includes: a first curved portion 34*a* whose midsection is curved so as to protrude toward a door section 17; and a second curved portion 34*b* whose midsection is curved so as to protrude away from the door section 17. When the door section 17 is opened, the first and second curved portions 34*a* and 34*b* are each extended and then the plate section 20 is pivoted around its junction with the second curved portion 34*b*.

4 Claims, 11 Drawing Sheets

VEHICLE AIR BAG DOOR

BACKGROUND OF THE INVENTION

1. Field of the Invention

The present invention relates to vehicle air bag doors.

2. Description of the Prior Art

A generally and widely known vehicle air bag door is one in which a door section is defined with a rupturable portion provided in a panel main body of an instrument panel, and the door section is opened by the activation of an air bag device provided to the bottom side of the panel main body.

Japanese Unexamined Patent Publication No. 2000-71924, for example, discloses a vehicle air bag door that is provided with a support assembly on the bottom side of a panel main body. The support assembly includes: an outer rim having an opening; a door flap that is located within the opening and is vibration welded to the bottom face of a door section; a support wall to which an air bag device is fastened; and a hinge section through which the outer rim and the door flap are connected. The support assembly is a molded resin article in which the door flap, the outer rim, the support wall and the hinge section are integrally formed. Furthermore, in this air bag door, the hinge section is formed into an approximate U-shape, and a rupturable portion is formed in a part of the panel main body overlapping the hinge section. Thus, upon activation of the air bag device, the rupturable portion is ruptured and the door flap is pivoted around the hinge section, thereby opening the door section.

On the other hand, Japanese Unexamined Patent Publication No. 2001-294114, for example, discloses another vehicle air bag door in which a hinge section is formed into a thin bellows-like shape or a thin approximate U-shape. Thus, when a door section is opened, the hinge section is extended and the door section is opened without its interference with a panel main body being caused.

In the former prior art example, since the door flap, the outer rim, the support wall and the hinge section are integrally formed, the number of components for supporting the air bag device can be reduced. However, since the hinge section is formed into an approximate U-shape and the door section is opened by pivoting the hinge section, the door section and the panel main body interfere with each other, which makes it impossible to widely open the door section. Furthermore, when the air bag device is activated, the door flap receives a pressure for deploying an air bag and pivots around the hinge section. At this time, since the support assembly is a molded resin article, an outer portion of the hinge section (i.e., a portion thereof having a larger radius of rotation) might be broken due to reception of an extension force in the direction in which the door flap is pivoted (turned). Therefore, the thickness of the hinge section, for example, must particularly be taken into consideration.

On the other hand, in the latter prior art example, the hinge section is formed into a thin bellows-like shape. Thus, when the door section is opened, a door flap is pivoted while the bellows-like hinge section is being extended. However, the door flap violently collides against a door-section-side edge of the panel main body, and therefore, the hinge section might be deformed or broken. In addition, since the hinge section is thin, the door section might be bent downward and broken when a load is applied to an instrument panel from above. Furthermore, such a problem might similarly occur in the case where the hinge section is formed into a thin U-shape.

SUMMARY OF THE INVENTION

The present invention has been made in view of the above-described points, and its object is to prevent a hinge section from being broken when a door section is opened and to open the door section with stability.

An inventive vehicle air bag door includes a door section that is provided at a panel main body and is opened by the activation of an air bag device.

The air bag door includes a back-up member provided on the bottom side of the panel main body. The back-up member includes: a back-up section having a shooting aperture through which an air bag expands into a cabin; a plate section located within the shooting aperture; and a hinge section through which the back-up section and the plate section are integrally connected. The back-up section, the plate section and the hinge section are integrally formed. A gap is formed between an outer edge of the shooting aperture and the plate section, the back-up section is welded to the bottom face of the panel main body at a portion thereof located around and outwardly of the door section, and the plate section is welded to the bottom face of the door section.

The hinge section includes: a first curved portion in which one end of the first curved portion is integrally connected to the back-up section, and a midsection of the first curved portion is curved so as to protrude toward the door section; and a second curved portion in which one end of the second curved portion is integrally connected to the other end of the first curved portion, the other end of the second curved portion is integrally connected to the plate section, and a midsection of the second curved portion is curved so as to protrude away from the door section. When the door section is opened, the first and second curved portions of the hinge section are each extended and then the plate section is pivoted around its junction with the second curved portion.

In such an embodiment, when the door section is opened, the first and second curved portions of the hinge section are each extended and then the plate section is pivoted around its junction with the second curved portion. Therefore, the hinge section can be prevented from abutting against a door-section-side edge of the panel main body when the door section is opened. As a result, the breakage of the hinge section can be prevented, and thus the door section can be opened with stability.

The shooting aperture may have an approximately rectangular shape, and corners of the shooting aperture may each be formed to have a curved surface. In that case, the hinge section may be provided to extend along one side of the shooting aperture, and the plate section may include: a plate section main body integrally connected to the hinge section; and extensions that are located outwardly of both longitudinal ends of the hinge section, integrally extended from the plate section main body to the vicinities of the corners of the shooting aperture, and welded to the bottom face of the door section. Furthermore, gaps may be formed between the extensions and the outer edge of the shooting aperture, and between the extensions and both the longitudinal ends of the hinge section.

In such an embodiment, due to the extensions, the plate section can be welded to the panel main body also in the vicinities of the corners of the shooting aperture which are located outwardly of both the longitudinal ends of the hinge section. Besides, since the plate section main body and the extensions are welded to the bottom face of the door section, the stiffness of the panel main body can be further increased without degrading the function of the hinge section.

In particular, the size of the hinge section is comparatively large because the hinge section includes the first curved portion and the second curved portion. Therefore, the area of the gap between the back-up section and the plate section main body which are connected via the hinge section is enlarged. However, the gap can be approximately closed by providing the extensions from the plate section main body, and the stiffness of the panel main body can be increased by welding the extensions to the panel main body.

The present inventors carried out experiments to find out the fact that the breakage of a hinge section when a door section opens is caused by cracking that occurs from both longitudinal ends of the hinge section toward an inner portion thereof. Another inventive vehicle air bag door is provided in light of this experimental result.

Specifically, another inventive vehicle air bag door includes a door section that is provided at a panel main body and is opened by the activation of an air bag device.

The air bag door further includes a back-up member provided on the bottom side of the panel main body. The back-up member includes: a back-up section having an approximately rectangular shooting aperture through which an air bag expands into a cabin; a plate section located within the shooting aperture; and a hinge section which is provided to extend along one side of the shooting aperture and through which the back-up section and the plate section are integrally connected. The back-up section, the plate section and the hinge section are integrally formed. A gap is formed between an outer edge of the shooting aperture and each of the outer periphery of the plate section and both longitudinal ends of the hinge section. The back-up section is welded to the bottom face of the panel main body at a portion thereof located around and outwardly of the door section, and the plate section is welded to the bottom face of the door section.

The hinge section includes: a cross-sectionally curved part extending in a lengthwise direction of the hinge section; and ribs that are integrally formed with the hinge section at the bottom face of the curved part which is opposite to the door section and in the vicinities of both longitudinal ends of the curved part.

In such an embodiment, when the air bag expands into the cabin by the activation of the air bag device, the plate section and the door section with the bottom face thereof welded to the plate section burst open upon receipt of a pressure for deploying the air bag, and the plate section and door section are opened in such a manner as to pivot around the hinge section extending along one side of the shooting aperture. At this time, the hinge section receives a large extension force via the plate section that is turned together with the door section. However, since the hinge section is integrally formed with the ribs at the bottom face of the curved part which is opposite to the door section and in the vicinities of both the longitudinal ends of the curved part, the stiffness in the vicinities of both the longitudinal ends at which cracking might start is increased. Therefore, according to the present invention, even if the hinge section has received a large force from the plate section as described above, cracking does not occur in the hinge section and thus the breakage thereof is not caused. As a result, when the door section is turned, the breakage of the hinge section is effectively prevented and thus the door section can be opened with stability.

The curved part may include: a first curved portion in which one end of the first curved portion is integrally connected to the back-up section, and a midsection of the first curved portion is curved so as to protrude toward the door section; and a second curved portion in which one end of the second curved portion is integrally connected to the other end of the first curved portion, the other end of the second curved portion is integrally connected to the plate section, and a midsection of the second curved portion is curved so as to protrude away from the door section. In that case, the ribs may be formed across the first and second curved portions.

In such an embodiment, the curved part of the hinge section includes: the first curved portion whose midsection is curved so as to protrude toward the door section; and the second curved portion whose midsection is curved so as to protrude away from the door section, and the ribs are formed across both the curved portions. Therefore, when the door section is opened, the angle at which the door section is opened can be widely secured by extending these curved portions to open the door section, and the stiffness of both the longitudinal ends of the hinge section can be increased due to the ribs. In other words, according to the present invention, the breakage of the hinge section is effectively prevented by increasing the stiffness of both the longitudinal ends of the hinge section, and at the same time, the door section can be stably opened at a large angle by extending the curved portions when the door section is turned.

The plate section may include: a plate section main body integrally connected to the hinge section; and extensions that are located outwardly of both the longitudinal ends of the hinge section, integrally extended from the plate section main body to the vicinities of corners of the shooting aperture, and welded to the bottom face of the door section, and furthermore, gaps may be formed between the extensions and the outer edge of the shooting aperture and between the extensions and both the longitudinal ends of the hinge section. In that case, the ribs may be formed continuously from the hinge section to the extensions of the plate section.

In such an embodiment, the plate section is provided with the extensions that are located outwardly of both the longitudinal ends of the hinge section and are extended from the plate section main body to the vicinities of the corners of the shooting aperture at the outer edge thereof. Therefore, by welding the extensions of the plate section to the panel main body, the reinforcing effect of the plate section can be further enhanced in the vicinities of the gaps formed outwardly of both the longitudinal ends of the hinge section and between both the longitudinal ends and the outer edge of the shooting aperture. Furthermore, the ribs, provided in the vicinities of both the longitudinal ends of the hinge section, are extended to the extensions of the plate section, and the ribs are formed continuously from the hinge section to the extensions. Therefore, the stiffness of the extensions themselves is increased due to the ribs, and thus cracking or scattering of the extensions can be prevented when the door section is turned.

DESCRIPTION OF THE PREFERRED EMBODIMENTS

Hereinafter, embodiments of the present invention will be described in detail with reference to the accompanying drawings. The following description is essentially only illustrative and is not intended to restrict the present invention, objects to which the present invention is applied, or use of the present invention.

<Embodiment 1>

Figure 1:
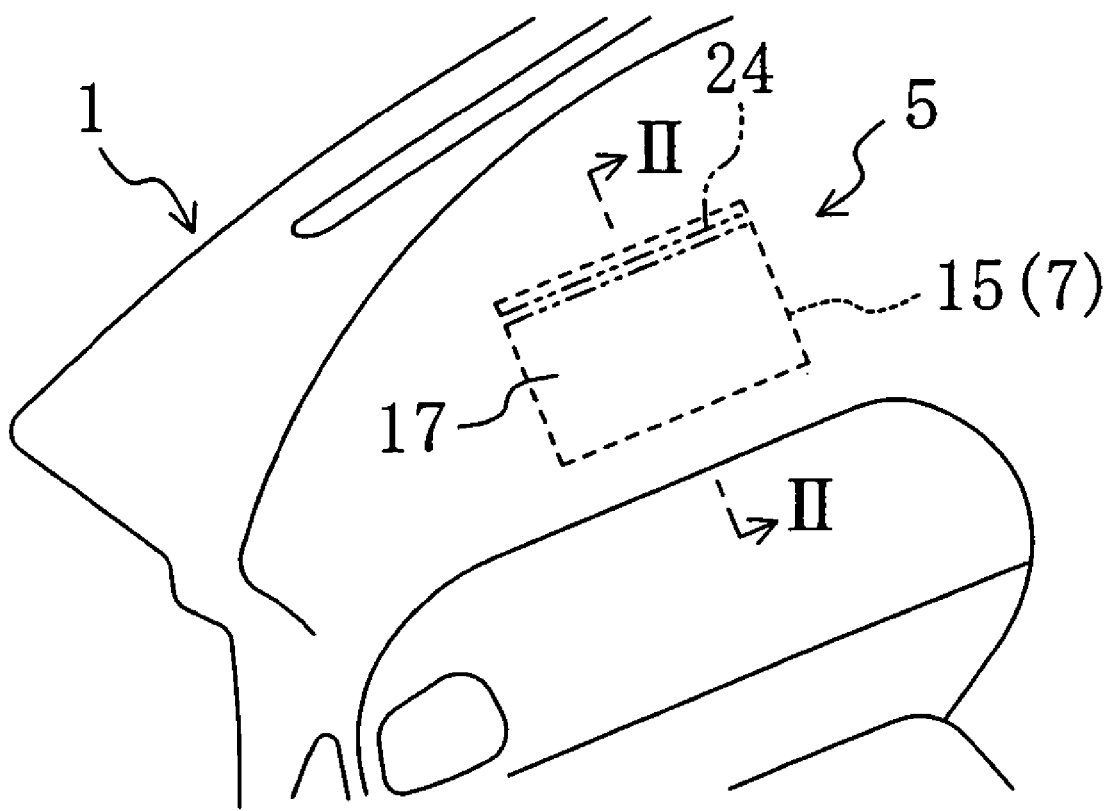
FIG. 1 a perspective view partially showing a panel main body including a vehicle air bag door according to Embodiment 1 of the present invention.
Figure 2:
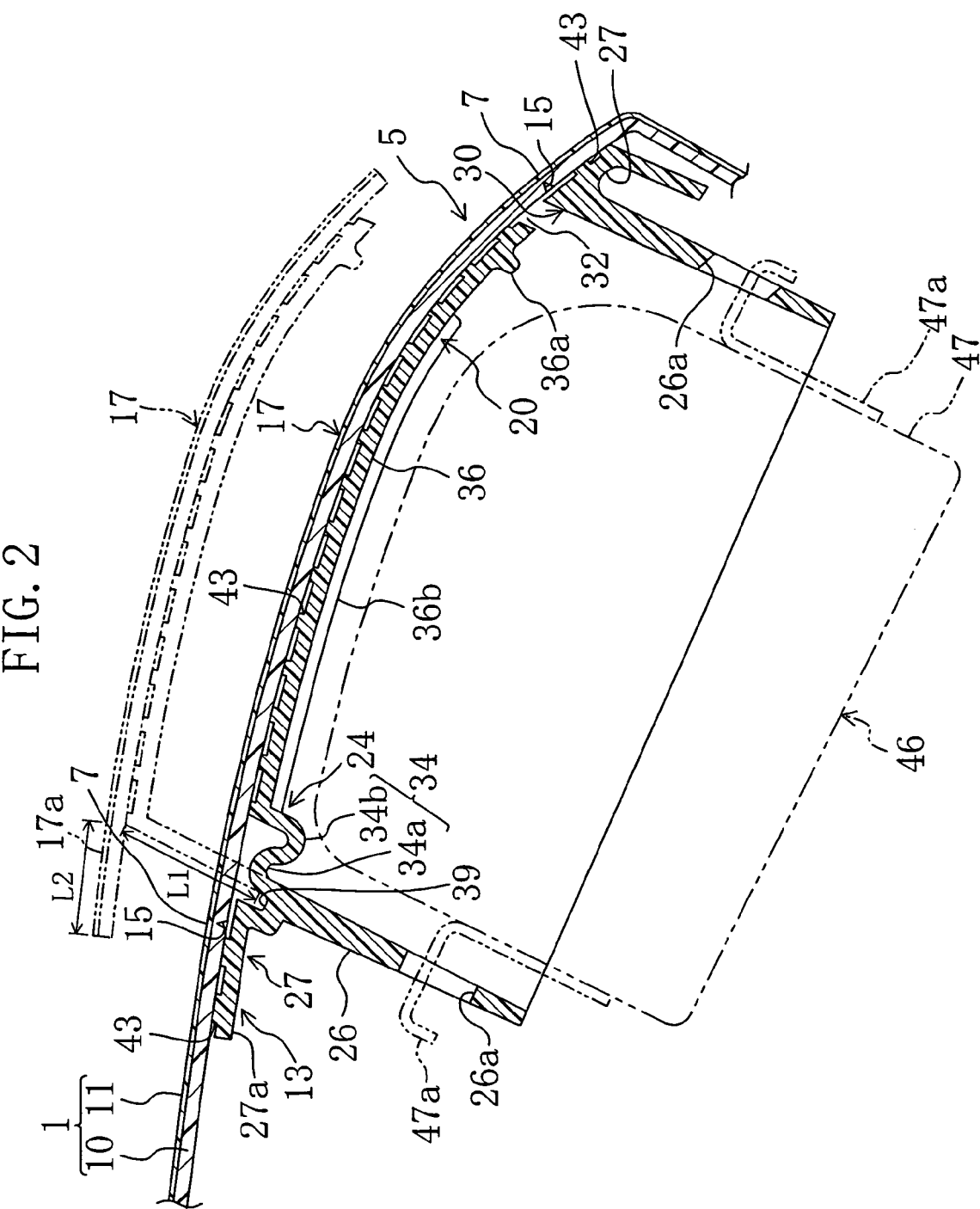
FIG. 2 is an enlarged cross-sectional view taken along the line II—II shown in FIG. 1.

FIG. 1 partially shows a panel main body 1 of an instrument panel A disposed at the front section of a cabin of a vehicle. The panel main body 1 is provided, at a portion thereof, i.e., a portion thereof associated with a passenger's seat, with an air bag door 5. As also shown in FIG. 2, the air bag door 5 includes a rupturable portion 7 that is to be ruptured when an air bag (not shown) is deployed. The air bag door 5 is of a so-called seamless type in which the rupturable portion 7 cannot be recognized from the top side of the panel main body 1. It should be noted that a portion of the air bag door 5 at the left side of FIG. 2 is located closer to the front of the vehicle, i.e., adjacent to the windshield of the vehicle, while a portion of the air bag door 5 at the right side of FIG. 2 is located closer to the rear of the vehicle, i.e., adjacent to the passenger's seat.

The panel main body 1 includes: a resin base member 10 that is provided by injection molding thermo plastic olefin (TPO), for example; and a skin member 11 integrally connected to the base member 10 at the top face thereof.

The base member 10 is provided at its bottom face with a groove 15 that is recessed toward the top face of the base member 10 and is provided so as to form each side of a rectangular door section 17 as viewed from the top face of the panel. Due to the groove 15, a thin portion is formed in the panel main body 1, and the thin portion serves as the rupturable portion 7. The rupturable portion 7 forms an outer edge of the rectangular door section 17 that is to be opened toward the front of the vehicle. In other words, the air bag door 5 includes the door section 17 that is opened due to deployment of the air bag, and a region around the door section 17.

On the bottom side of the panel main body 1, a back-up member 13 formed by a molded resin member is provided. The back-up member 13 includes: a back-up section 27 that is welded to the bottom face of the panel main body 1 at a portion thereof located around and outwardly of the door section 17; a reinforcing plate section 20 that is welded to the bottom face of the door section 17; and a hinge section 24 through which the back-up section 27 and the plate section 20 are integrally connected to each other. The welding is performed by a vibration welding process.

The back-up section 27 is a frame member, and is provided at its center position with a shooting aperture 30 through which the air bag expands into the cabin. The back-up section 27 extends from the outer edge of the shooting aperture 30 to the outside of the door section 17 along the bottom face of the base member 10.

The groove 15 is provided at a position facing the back-up section 27. That is, the groove 15 is provided at a portion of the panel main body 1 located around and outwardly of the plate section 20. Thus, the outer edge of the door section 17 projects more outward than the plate section 20.

Figure 3:
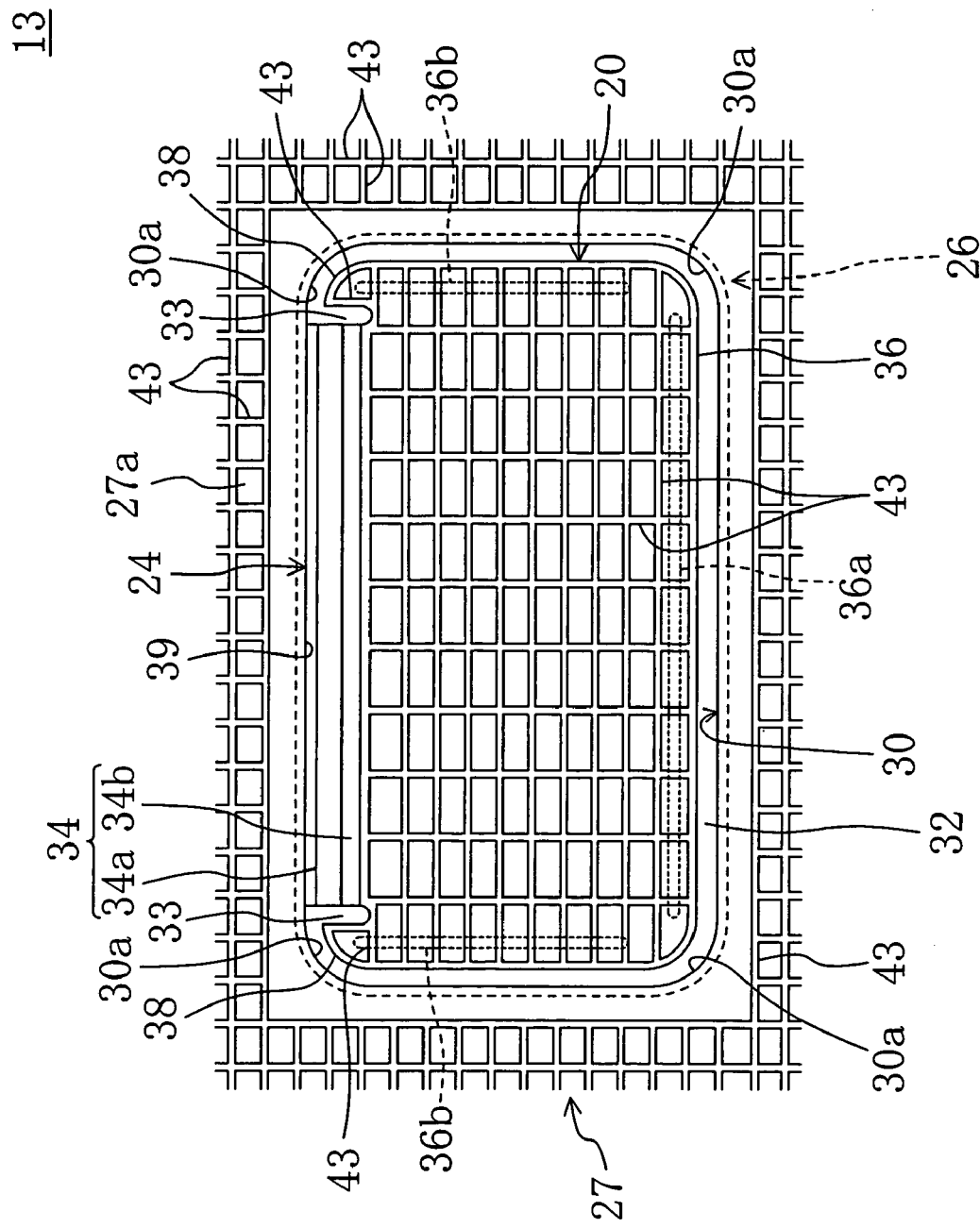
FIG. 3 is an enlarged plan view showing a back-up member according to Embodiment 1.

The shooting aperture 30 is formed into an approximately rectangular shape as shown in FIG. 3, and four corners 30a of the shooting aperture 30 are each formed to have a curved surface. It should be noted that FIG. 3 is a plan view showing the back-up member 13 from which the panel main body 1 is removed, as viewed from the plane at which the back-up member 13 and the panel main body 1 are supposed to be connected.

The plate section 20 is located within the shooting aperture 30, and a gap 32 with a predetermined width is formed continuously across a part of the back-up member 13 located between the outer portion of the plate section 20 and the outer edge of the shooting aperture 30 except the hinge section 24.

At a part of the outer edge of the shooting aperture 30 which is located closer to the front of the vehicle, the hinge section 24 is integrally connected to a front-side portion 27a of the back-up section 27. Specifically, the hinge section 24 is provided so as to extend in a widthwise direction of the vehicle along one side of the outer edge of the shooting aperture 30 which is located closer to the front of the vehicle. This is because the hinge section 24 cannot be welded to the bottom face of the door section 17. In other words, if the hinge section 24 is formed to extend to the corners 30a, each having a curved surface, the plane at which the panel main body 1 and the back-up member 13 are welded is decreased, thus reducing the reinforcing effect of plate section 20. Therefore, the hinge section 24 is provided to extend along one side of the shooting aperture 30 except the corners 30a, 30a located on both sides of the hinge section 24.

In addition, the front-side portion 27a of the back-up section 27 is provided with a concave 39 that is recessed downward (from the bottom side of the panel).

The overall hinge section 24 has a curved part 34 that is curved in cross section. The curved part 34 consists of a first curved portion 34a and a second curved portion 34b. The first curved portion 34a includes: a front end integrally connected to the front-side portion 27a of the back-up section 27; and a midsection curved so as to protrude toward the door section 17 (i.e., upward). On the other hand, the second curved portion 34b includes: a front end integrally connected to a rear end of the first curved portion 34a; a rear end integrally connected to a base end of the plate section 20; and a midsection curved so as to protrude away from the door section 17 (i.e., downward). The thickness of each of the first and second curved portions 34a and 34b is substantially equal to that of the plate section 20.

Furthermore, upon deployment of the air bag, the first and second curved portions 34a and 34b receive the deployment pressure via the plate section 20 and thus extend as indicated by the imaginary lines shown in FIG. 2. As a result, the door section 17 is pushed upwardly of the original position of the panel main body 1. A length L1 of both the extended curved portions 34a and 34b is set so that the length L1 is longer than a length L2 of a protruded part 17a of the door section 17 located at a base end side thereof.

The door section 17 that has been pushed upward is then allowed to pivot around the junction of the extended second curved portion 34b and the plate section 20 due to the deployment pressure.

The plate section 20 is formed into a plate-like shape substantially corresponding to the shooting aperture 30, and includes: an approximately rectangular plate section main body 36 integrally connected to the second curved portion 34b of the hinge section 24; and extensions 38 each integrally connected to the plate section main body 36. A base end of the plate section main body 36 has a midsection integrally connected to the rear end of the second curved portion 34b. Since the length of the plate section main body 36, measured in the widthwise direction of the vehicle, is longer than that of the hinge section 24, right and left ends of the plate section main body 36 are protruding more outward in the widthwise direction of the vehicle than the hinge section 24.

On the other hand, an extreme end of the plate section main body 36 is extended to the vicinity of a part of the outer edge of the shooting aperture 30 which is located closer to the rear of the vehicle. Thus, the plate section 20 is allowed to approximately close the shooting aperture 30. Both lateral edges of the extreme end of the plate section main body 36 are each formed to have a curved surface corresponding to that of the corner 30a of the shooting aperture 30.

The extensions 38 are formed integrally with both lateral edges of the base end of the plate section main body 36, and are each formed into an approximate fan shape in plan view so as to correspond to the shape of the corner 30a of the shooting aperture 30. Each extension 38 is located outwardly of the hinge section 24 so as to approximately close a part of the shooting aperture 30 in the vicinity of the associated corner 30a. The gap 32 is formed between the periphery of each extension 38 and the outer edge of the shooting aperture 30. Furthermore, a gap 33 is formed between each extension 38 and a longitudinal end of the hinge section 24 associated thereto.

It should be noted that a downwardly protruding extreme-end-side rib 36a is provided to extend substantially across the bottom face of the extreme end of the plate section main body 36 in the widthwise direction of the vehicle. On the other hand, downwardly protruding lateral-end-side ribs 36b are each provided to extend substantially across the bottom face of an associated one of the lateral ends (i.e., the right and left ends) of the plate section main body 36 in the lengthwise direction of the vehicle. Due to these ribs 36a and 36b, the stiffness of the plate section main body 36 is improved.

Provided at the top faces the plate section 20 and back-up section 27 are weld protrusions 43 through which the plate section 20 and back-up section 27 are vibration welded to the base member 10. The weld protrusions 43 at the plate section main body 36 and back-up section 27 are arranged in a lattice, while the weld protrusions 43 at the extensions 38 are each formed to extend along the outer edge thereof. With the weld protrusions 43, the plate section main body 36 and the extensions 38 are welded to the bottom face of the base member 10 at a portion thereof located at the door section 17, and the backup section 27 is welded to the bottom face of the base member 10 at a portion thereof located around and outwardly of the door section 17.

The back-up member 13 is integrally formed with an approximately rectangular tubular section 26 extending from the outer edge of the shooting aperture 30 and away from the panel main body 1. The plate section 20, the back-up section 27, the hinge section 24 and the tubular section 26 are integrally formed by injection molding.

Provided within the tubular section 26 is an air bag device 46 for protecting an occupant in the passenger's seat from the shock applied in the lengthwise direction of the vehicle. The air bag device 46 includes an air bag case 47 for accommodating the air bag and an inflator (not shown). The air bag case 47 is provided with hooklike fittings 47a that are fixed thereto and are inserted through elongated holes 26a in the tubular section 26. The air bag in a folded state is accommodated in the air bag case 47, and the inflator generates gas upon detection of the shock applied on the vehicle. Due to the gas generated by the activation of the inflator, the air bag is inflated and deployed.

The air bag case 47 is attached to an instrument panel reinforcement (not shown) that is extended in the widthwise direction of the vehicle and that is secured at its both ends to the vehicle body.

As described above, according to the present embodiment, the plate section 20 (which is welded to the bottom face of the door section 17), the back-up section 27 (which is welded to the bottom face of the panel main body 1 at a portion thereof located around and outwardly of the door section 17), and the hinge section 24 (through which the plate section 20 and the back-up section 27 are connected) are integrally formed, and furthermore, each of the first and second curved portions 34a and 34b of the hinge section 24 is formed to have a thickness substantially equal to that of the plate section 20. Thus, the strength of the panel main body 1 can be easily secured. Accordingly, deformation or breakage of the panel main body 1 does not occur even if a vehicle occupant, for example, has pressed the panel main body 1 from the top side thereof. Besides, the strength of the hinge section 24 can be secured such that it is not ripped apart when the door section 17 is opened following activation of the air bag device 46 as described above.

Figure 4:
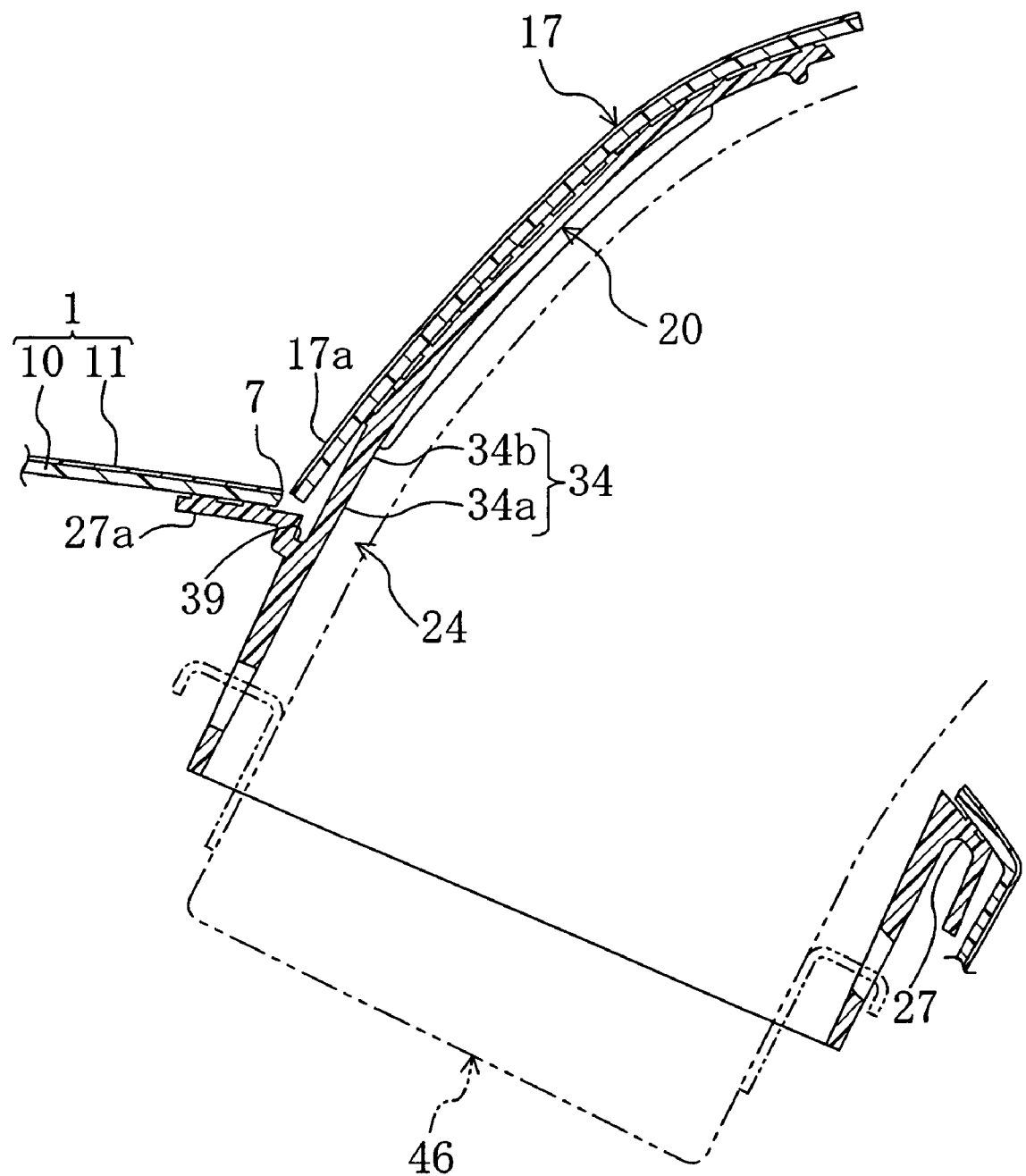
FIG. 4 is a cross-sectional view that corresponds to FIG. 2 and shows a door section in its opened state in the air bag door according to Embodiment 1.

Upon expansion of the air bag by the activation of the air bag device 46, the rupturable portion 7 of the panel main body 1 receives a pressure for deploying the air bag and ruptures. In this case, as indicated by the imaginary lines shown in FIG. 2, the first and second curved portions 34a and 34b are each extended, and the door section 17 is thus pushed upwardly of the original position of the panel main body 1. At this time, the skin member 11. at the rupturable portion 7 is ruptured in the same manner as the base member 10 at the rupturable portion 7. Thereafter, as shown in FIG. 4, the plate section 20 pivots around its junction with the second curved portion 34b together with the door section 17 in a counterclockwise direction in FIG. 4, and the door section 17 is opened to allow the air bag to expand into the cabin. Thus, it is possible to prevent the breakage of the hinge section 24 resulting from the collision thereof with a door-section-side edge of the panel main body 1 when the door section 17 is opened, and therefore, it is possible to open the door section 17 with stability.

By providing the concave 39 in the front-side portion 27a of the back-up section 27, the first curved portion 34a protruding toward the panel main body 1 can be formed in the hinge section 24. Further, by connecting the first curved portion 34a with the second curved portion 34b whose midsection protrudes away from the panel main body 1, it becomes possible to sufficiently secure the length L1 of both the extended curved portions 34a and 34b such that when the door section 17 is opened, the protruded part 17a does not interfere with a part of the panel main body 1 located outwardly of the door section 17. Thus, the protruded part 17a can also be provided at a hinge-side portion of the door section 17, and therefore, the groove 15 can be provided at a position facing the back-up section 27. As a result, the stiffness of the door section 17 can be increased.

When the door section 17 is opened, the first and second curved portions 34a and 34b are extended and then the door section 17 is opened; therefore, the angle at which the door section 17 is opened can be increased.

The skin member 11 at a hinge-side part of the rupturable portion 7 may be peeled away from the base member 10 and may be in a connected state without being broken when the door section 17 is opened.

Moreover, the shooting aperture 30 in which the plate section 20 is located is formed into an approximate rectangular shape with each corner 30a thereof having a curved surface, and the plate section 20 is provided, at its portions located outwardly of both the longitudinal ends of the hinge section 24, with the extensions 38 each extending from the plate section main body 36 to the vicinity of the associated corner 30a of the shooting aperture 30. Due to the extensions 38, the plate section 20 can be welded to the panel main body 1 also at the portions of the plate section 20 which are located outwardly of both the ends of the hinge section 24. Since the extensions 38 and the plates section main body 36 are welded to the bottom face of the door section 17, the stiffness of the panel main body 1 can be further increased without degrading the function of the hinge section 24.

In particular, since the hinge section 24 includes the first and second curved portions 34a and 34b and they are each formed to have a thickness substantially equal to that of the plate section 20, the gap between the front-side portion 27a of the back-up section 27 and the plate section main body 36 is increased in area. However, this gap can be approximately closed by providing the plate section main body 36 with the extensions 38, and furthermore, the stiffness of the panel main body 1 can be increased by welding the extensions 38 to the panel main body 1.

Although the hinge section 24 is substantially equal in thickness to the plate section 20 in the present embodiment, the hinge section 24 may be thinner than the plate section 20 as long as the hinge section 24 does not rupture when the door section 17 is opened.

<Embodiment 2>

Figure 5:
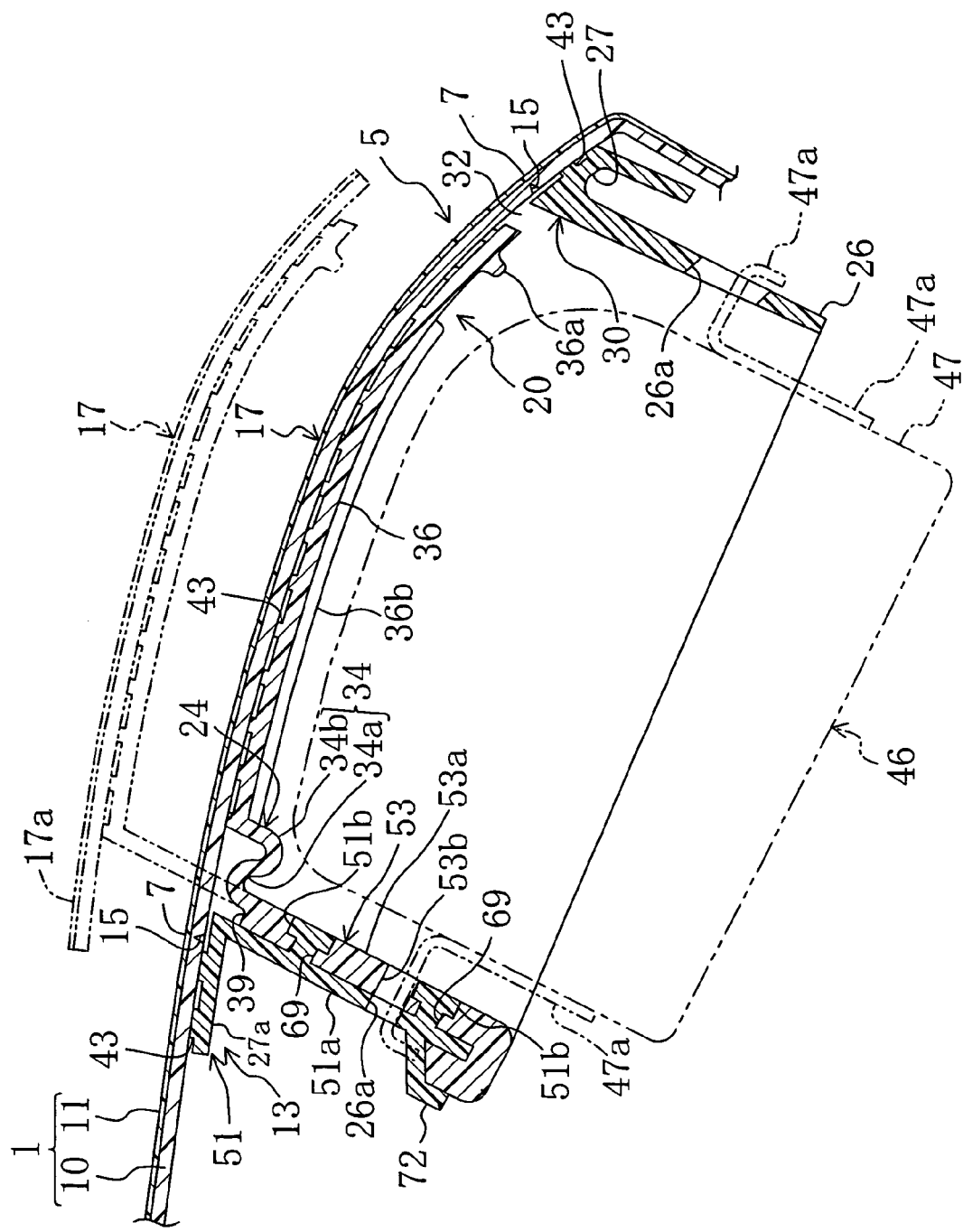
FIG. 5 is a cross-sectional view showing an air bag door according to Embodiment 2.

FIG. 5 illustrates Embodiment 2 of the present invention. It should be noted that in the present embodiment, the same constituting elements as those described in Embodiment 1 are identified by the same reference characters, and the detailed description thereof will be omitted.

In Embodiment 2, as shown in FIG. 5, a back-up member 13 includes a first molded part 51 and a second molded part 53. The first molded part 51 is made of a first resin material, and constitutes a back-up section 27. The first molded part 51 is integrally formed with a rectangular tubular section 26 extending from a shooting aperture 30 within the back-up section 27 and away from the panel main body 1. At the inner side of the tubular section 26, a front-side portion 51a of the tubular section 26 is integrally formed with a hinge-side extension 53a of the second molded part 53. The second molded part 53 is made of a second resin material similar to or different from the first resin material used for the first molded part 51, and constitutes a plate section 20, a hinge section 24 and the hinge-side extension 53a which are integrally formed so as to have an approximate L-shape in cross section.

According to Embodiment 2, both the molded parts 51 and 53 are provided by a so-called dual injection molding technique in which the first molded part 51 is injection molded, and then the second molded part 53 is injection molded so that the hinge-side extension 53a of the second molded part 53 is integrally formed with the front-side portion 51a of the tubular section 26 of the first molded part 51.

A concave 39 is formed by molding the molded parts 51 and 53 so that a top side edge of the hinge-side extension 53a is located at a lower level than a top side edge of a front-side portion 27a of the first molded part 51 with respect to the bottom side of the panel.

An end (lower end) of the hinge-side extension 53a is bended toward the outer side of the tubular section 26 and is thus formed into an approximate U-shape in cross section. Furthermore, the hinge-side extension 53a is provided with: an elongated hole 53b through which front-side fittings 47a for hooking an air bag case 47 are inserted; and a plurality of fixture holes 69 each passing through the hinge-side extension 53a in a thickness direction thereof. Each fixture hole 69 is a stepped hole in which the area of the hole at the inner side of the hinge-side extension 53a is made larger than that of the hole at the outer side of the hinge-side extension 53a in a step-wise manner.

The front-side portion 51a of the first molded part 51 includes: a plurality of protrusions 51b protruding from the inner surface of the front-side portion 51a; and an engaging piece 72 protruding obliquely downward from the outer surface of an end of the front-side portion 51a. Each protrusion 51b is a stepped protrusion in which the tip thereof has a larger diameter, and is formed to be inextricable from the associated fixture hole 69 of the hinge-side extension 53a. The first and second molded parts 51 and 53 are molded so that the end of the front-side portion 51a is located within the end of the hinge-side extension 53a which is approximately U-shaped in cross section, and so that an outer portion of the end of the hinge-side extension 53a is engaged between the engaging piece 72 and the end of the front-side portion 51a.

In other arrangements, Embodiment 2 is similar to Embodiment 1.

Thus, in Embodiment 2, it is possible to prevent the breakage of the hinge section 24 resulting from the collision thereof with a door-section-side edge of the panel main body 1 when the door section 17 opens, and to open the door section 17 with stability like Embodiment 1.

Suppose that the first resin material and the second resin material are different. In that case, if the materials used as the first and second resin materials are selected according to purposes, the resulting first and second molded parts 51 and 53 can more effectively carry out their respective functions. For example, a resin material with a higher strength may be used for the first molded part 51, and a tough resin material that is unlikely to scatter when the door section 17 opens may be used for the second molded part 53.

The back-up member 13 may be provided by separately molding the first molded part 51 and the second molded part 53 and by fastening the first and second molded parts 51 and 53 to each other afterward, instead of utilizing the dual injection molding technique. In addition, the first and second resin materials may be identical.

As for other functions and effects, Embodiment 2 is similar to Embodiment 1.

<Embodiment 3>

Figure 6:
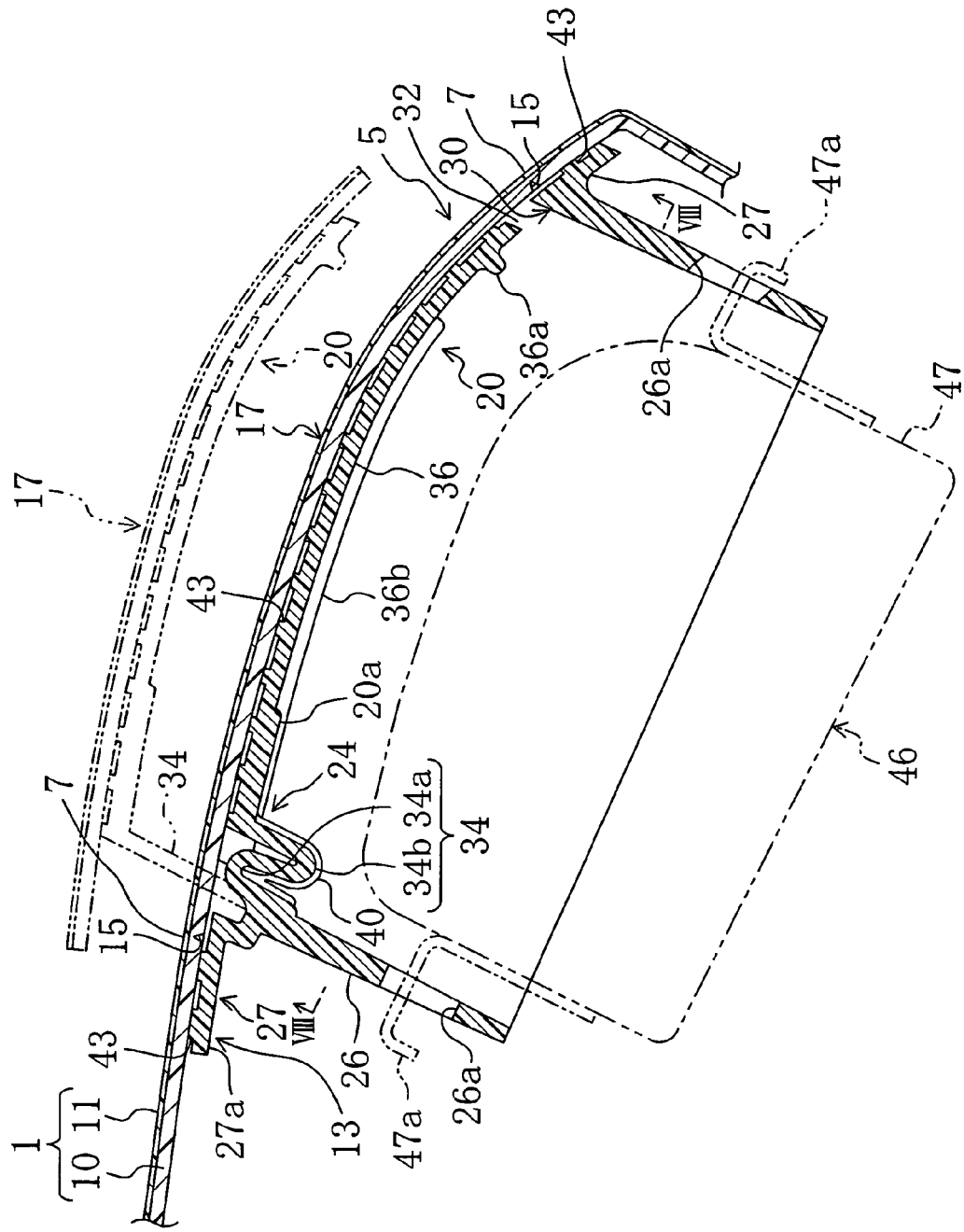
FIG. 6 is a cross-sectional view showing an air bag door according to Embodiment 3.
Figure 7:
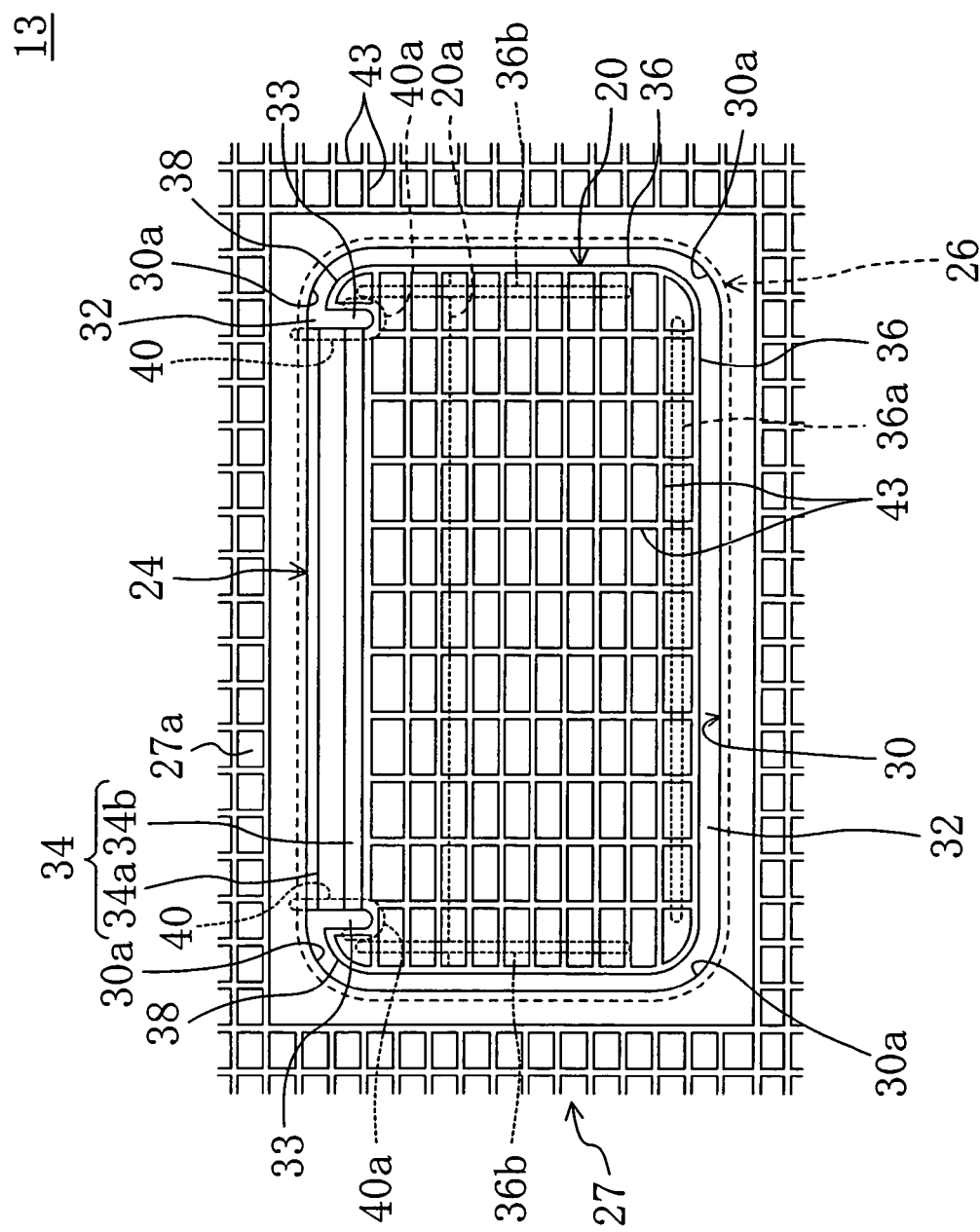
FIG. 7 is an enlarged plan view showing a back-up member according to Embodiment 3.
Figure 8:
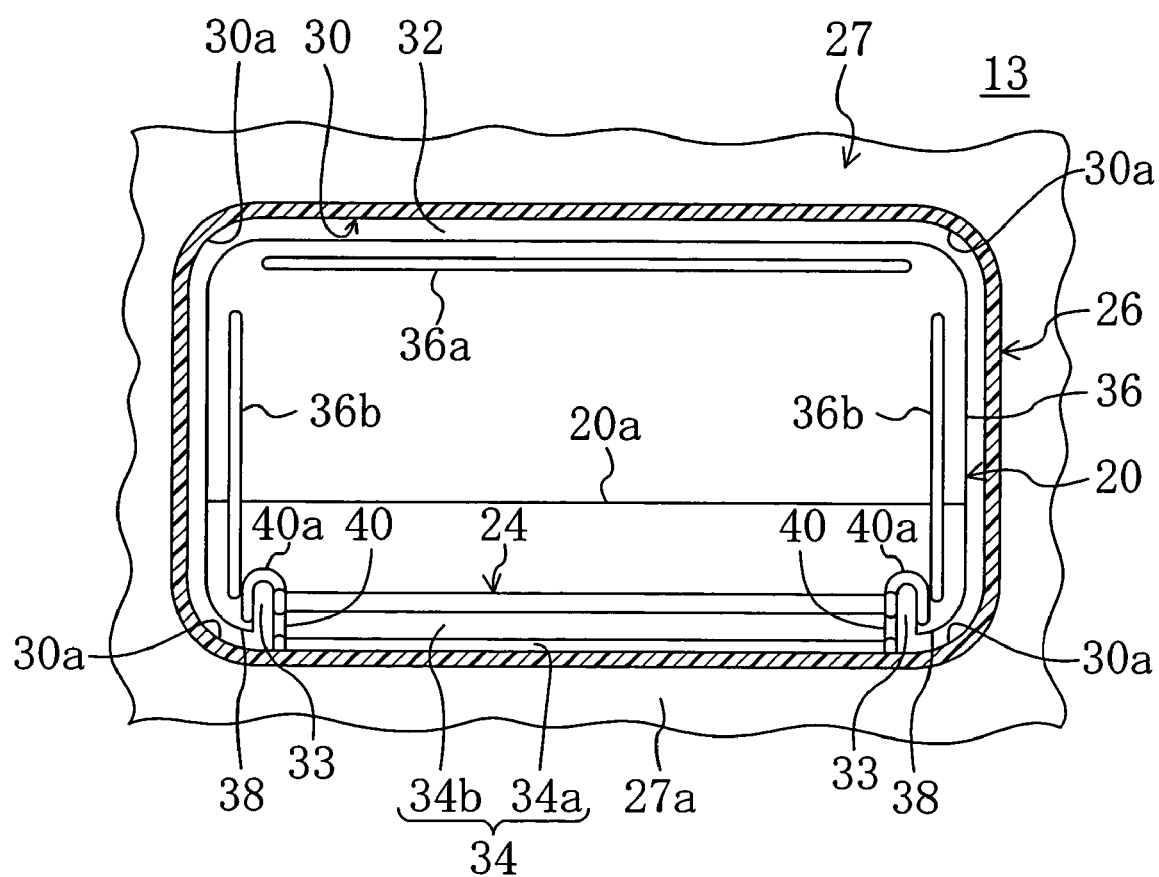
FIG. 8 is a cross-sectional view taken along the line VIII—VIII shown in FIG. 6.

FIGS. 6 through 8 illustrate Embodiment 3 of the present invention. It should be noted that in the present embodiment, the same constituting elements as those described in Embodiments 1 and 2 are identified by the same reference characters, and the detailed description thereof will be omitted.

In Embodiment 3, as shown in FIGS. 6 through 8, ribs 40 are integrally formed with a hinge section 24. Each rib 40 is protruded from the bottom face of an associated one of longitudinal ends of the hinge section 24 (which is opposite to a door section 17). Each rib 40 is formed continuously across first and second curved portions 34a and 34b of the hinge section 24 so as to extend along both the curved portions 34a and 34b. Further, each rib 40 has a rib extension 40a that extends from one end of the rib 40 to reach a base end of a plate section main body 36, and straddlingly extends to an inner end of an associated one of extensions 38. In other words, each rib 40 is formed continuously from the hinge section 24 to the associated extension 38 of a plate section 20.

Furthermore, the plate section 20 is formed with a thick portion 20a. To the extent that the length of the thick portion 20a measured in the lengthwise direction of the vehicle is about a quarter of the length of the plate section main body 36 measured in the lengthwise direction of the vehicle, the thick portion 20a is risen from the bottom face of the plate section 20 not only across a front-side portion (base-end-side portion) of the plate section main body 36 in the widthwise direction of the vehicle but also across the extensions 38.

In other arrangements, Embodiment 3 is similar to Embodiment 1.

In an air bag door 5 according to Embodiment 3, when an air bag expands into a cabin by the activation of an air bag device 46, the air bag presses the plate section 20. Thus, the door section 17 of a panel main body 1, whose bottom face is welded to the plate section 20, is also pressed by the air bag, and a rupturable portion 7 at the outer edge of the door section 17 is ruptured. And as indicated by the imaginary lines shown in FIG. 6, the first and second curved portions 34a and 34b of the hinge section 24 are pushed upwardly of the original position of the panel main body 1 while they are being extended. It should be noted that a skin member 11 at the rupturable portion 7 is ruptured in the same manner as a base member 10 at the rupturable portion 7.

Thus, the hinge section 24 receives a large extension force via the plate section 20 that is turned together with the door section 17. In this case, since the hinge section 24 is integrally provided with the ribs 40 located in the vicinities of both the longitudinal ends of the hinge section 24, the strength in the vicinities of both the longitudinal ends at which cracking might start is increased. Therefore, even if the hinge section 24 receives a large extension force from the plate section 20 as described above, cracking will not occur in the hinge section 24 and thus the hinge section 24 will not be broken. Consequently, the breakage of the hinge section 24 is effectively prevented, thereby making it possible to open the door section 17 with stability.

Figure 9:
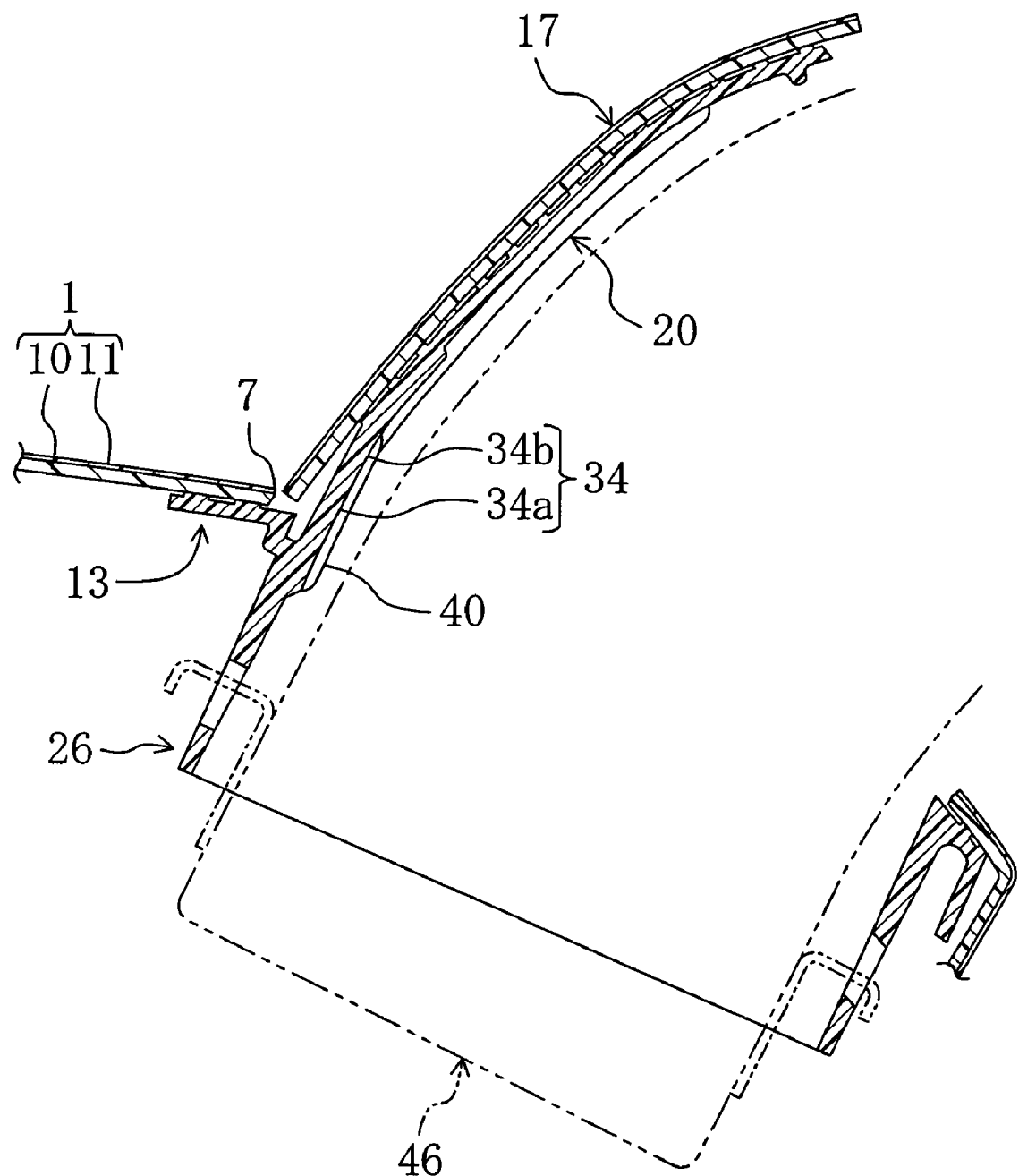
FIG. 9 is a cross-sectional view that corresponds to FIG. 6 and shows a door section in its opened state in the air bag door according to Embodiment 3.

After the hinge section 24 has been extended as described above, as shown in FIG. 9, the plate section 20 pivots around its junction with the second curved portion 34b together with the door section 17, and the door section 17 is opened to allow the air bag to expand into the cabin.

In Embodiment 3, when the door section 17 is opened, the first and second curved portions 34a and 34b are extended and then the door section 17 is opened; therefore, the angle at which the door section 17 is opened can be increased. Thus, the strength of the hinge section 24 at its both ends is increased to effectively prevent the breakage of the hinge section 24, and the first and second curved portions 34a and 34b are extended when the door section 17 is turned, thereby stably opening the door section 17 at a large angle.

Furthermore, in Embodiment 3, the extensions 38 are integrally formed with the plate section main body 36 of the plate section 20 in the vicinities of the longitudinal ends of the hinge section 24. Thus, also in the vicinities of a gap 32 located between the plate section 20 and the outer edge of a shooting aperture 30 and outwardly of both the longitudinal ends of the hinge section 24, the reinforcing effect of the plate section 20 can be further increased by welding the extensions 38 of the plate section 20 to the panel main body 1. Besides, the ribs 40 integrally formed with the hinge section 24 in the vicinities of both the ends of the hinge section 24 are extended to the extensions 38, and the ribs 40 are formed continuously from the hinge section 24 to the extensions 38. Thus, the stiffness of the extensions 38 themselves is increased by the ribs 40, and as a consequence, the cracking or scattering of the extensions 38 can be prevented.

The skin member 11 at a hinge-side part of the rupturable portion 7 may be peeled away from the base member 10 and may be in a connected state without being broken when the door section 17 is opened.

In Embodiment 3, the hinge section 24 is not limited to a structure in which its curved part 34 consists of two curved portions, i.e., the first and second curved portions 34a and 34b. Alternatively, the hinge section 24 may be formed by, for example, one curved portion that is approximately U-shaped in cross section.

As for other functions and effects, Embodiment 3 is similar to Embodiment 1.

<Embodiment 4>

Figure 10:
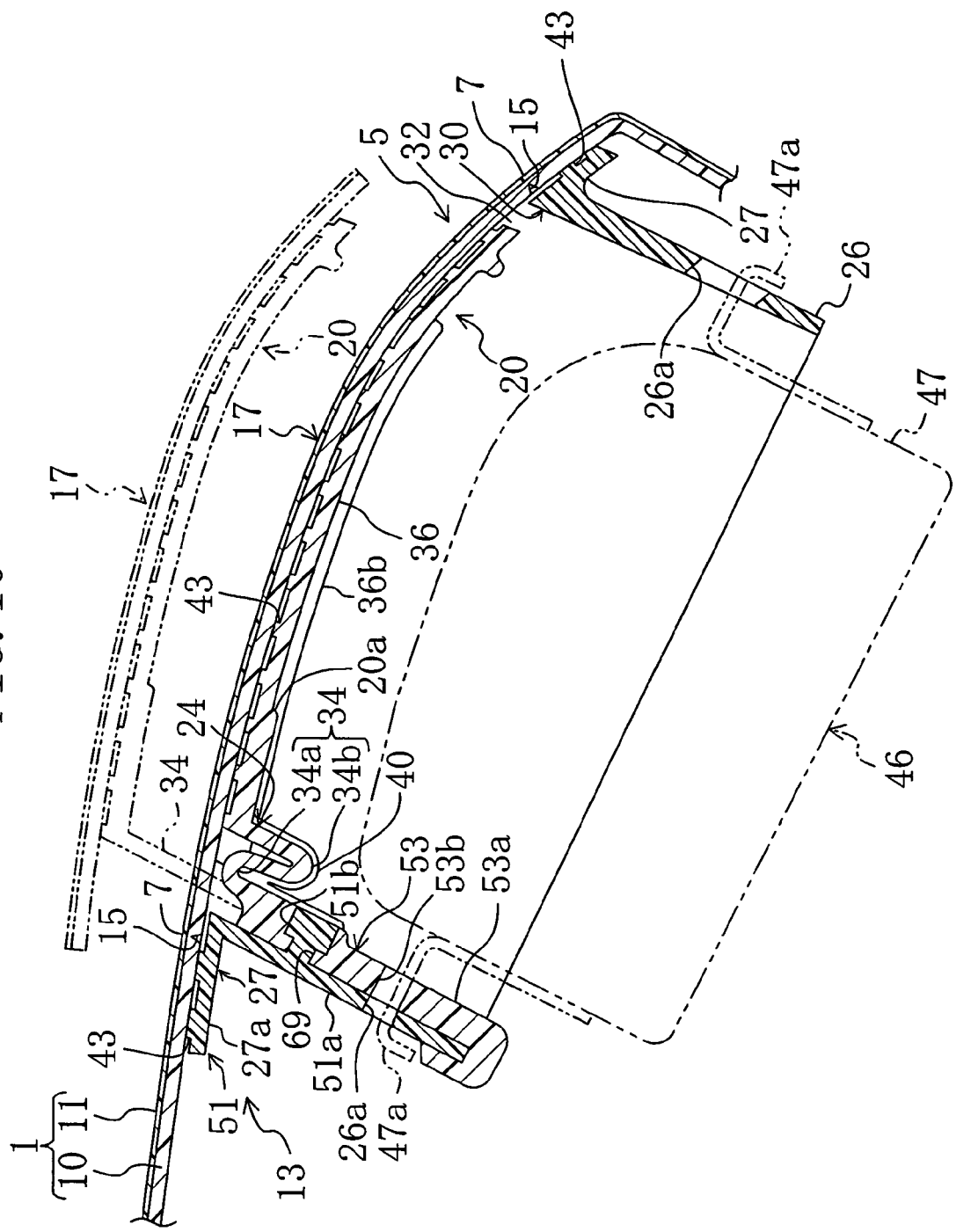
FIG. 10 is a cross-sectional view showing an air bag door according to Embodiment 4.

FIG. 10 illustrates Embodiment 4 of the present invention. It should be noted that in the present embodiment, the same constituting elements as those described in Embodiments 1 through 3 are identified by the same reference characters, and the detailed description thereof will be omitted.

In Embodiment 4, as shown in FIG. 10, a back-up member 13 includes a first molded part 51 and a second molded part 53. The first molded part 51 is made of a first resin material, and constitutes a back-up section 27. The first molded part 51 is integrally formed with a rectangular tubular section 26 extending from a shooting aperture 30 within the back-up section 27 and away from the panel main body 1.

The second molded part 53 is made of a second resin material that is similar to or different from the first resin material used for the first molded part 51, and constitutes a plate section 20, a hinge section 24 and a hinge-side extension 53a which are integrally formed so as to have an approximate L-shape in cross section.

Both the molded parts 51 and 53 are provided by a so-called dual injection molding technique.

An end (lower end) of the hinge-side extension 53a of the second molded part 53 is bended toward the outer side of the tubular section 26 and is thus formed into an approximate U-shape in cross section. Furthermore, the hinge-side extension 53a is provided with an elongated hole 53b through which front-side fittings 47a for hooking an air bag case 47 are inserted. In these respects, Embodiment 4 is similar to Embodiment 2. However, Embodiment 4 differs from Embodiment 2 in that only one fixture hole 69 that passes through the hinge-side extension 53a in a thickness direction thereof is provided.

The first molded part 51 is provided, at its front-side portion 51a, with a protrusion 51b protruding from the inner surface of the front-side portion 51a. The protrusion 51b is insert molded in the fixture hole 69 of the hinge-side extension 53a, and the first and second molded parts 51 and 53 are integrally formed so that the protrusion 51b is inextricable from the fixture hole 69 of the hinge-side extension 53a.

In other arrangements, Embodiment 4 is similar to Embodiment 3.

Therefore, in Embodiment 4, ribs 40 are integrally formed with the hinge section 24 in the vicinities of its longitudinal ends, and the stiffness in the vicinities of both the longitudinal ends at which cracking might start is increased as in Embodiment 3. Thus, also in Embodiment 3, even if the hinge section 24 receives a large extension force from the plate section 20, cracking will not occur and thus the hinge section 24 will not be broken. Consequently, the breakage of the hinge section 24 is effectively prevented, thereby making it possible to open the door section 17 with stability.

Suppose that the materials used for the first and second molded parts 51 and 53 are different. In that case, if the materials used are selected according to purposes, the resulting first and second molded parts 51 and 53 can more effectively carry out their respective functions.

Furthermore, the back-up member 13 may be provided by separately molding the first molded part 51 and the second molded part 53, for example, and by fastening the first and second molded parts 51 and 53 to each other afterward, instead of utilizing the dual injection molding technique.

As for other functions and effects, Embodiment 4 is similar to Embodiment 3.

In Embodiment 4, the hinge section 24 is not limited to a structure in which its curved part 34 consists of two curved portions, i.e., the first and second curved portions 34a and 34b. Alternatively, the hinge section 24 may be formed by, for example, one curved portion that is approximately U-shaped in cross section.

<Embodiment 5>

Figure 11:
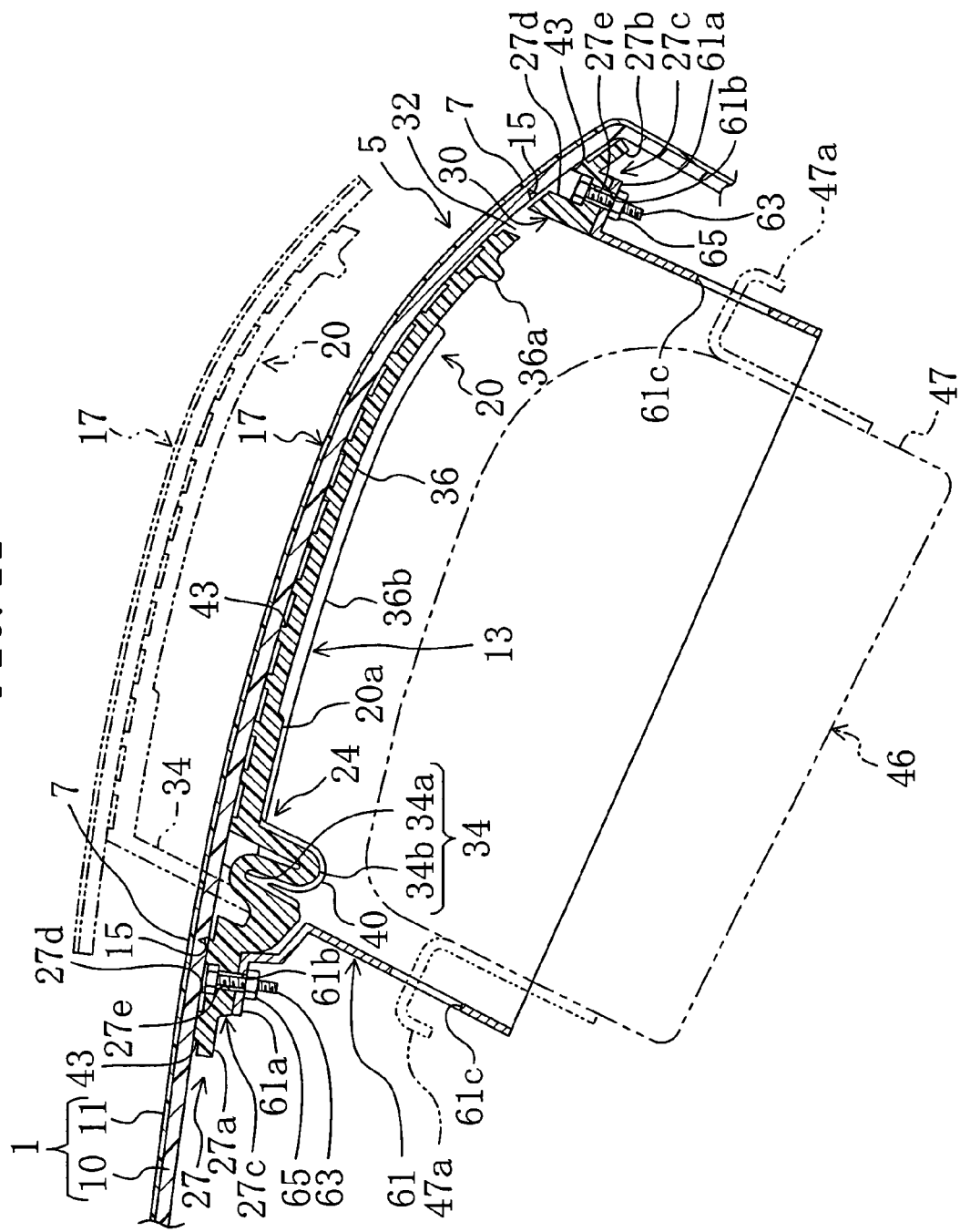
FIG. 11 is a cross-sectional view showing an air bag door according to Embodiment 5.

FIG. 11 illustrates Embodiment 5 of the present invention (it should be noted that in the present embodiment, the same constituting elements as those described in Embodiments 1 through 4 are identified by the same reference characters, and the detailed description thereof will be omitted). As shown in FIG. 11, in Embodiment 5, a back-up member 13, which is made of resin, includes a back-up section 27, a plate section 20 and a hinge section 24 which are integrally formed. In other words, in Embodiment 5, the back-up member 13 is not integrally formed with a tubular section by injection molding unlike Embodiments 1 through 4.

The back-up section 27 is integrally provided with a plurality of junctions 27c that are spaced a certain distance apart along a shooting aperture 30. The junctions 27c each include: a boxlike recess 27d opened upward; and a through hole 27e passing through the bottom of the recess 27d. One of the junctions 27c is located in front of the shooting aperture 30, while the other junction 27c is located behind the shooting aperture 30.

The back-up member 13 is integrally provided at its lower part with a metal frame member 61 as a tubular section. Specifically, the frame member 61 has an approximately rectangular shape, and is integrally provided at its upper end with a fixture part 61a that is projected outward toward the front and rear of the vehicle. The fixture part 61a is formed with through holes 61b each provided to communicate with the through hole 27e of the corresponding junction 27c. The heads of bolts 63 are fitted into the recesses 27d of the junctions 27c such that the heads are unrotatably held, and the threads of the bolts 63 are passing through the through holes 27e of the junctions 27c and protruding downward from the through holes 61b of the fixture part 61a. By screwing nuts 65 to the threads of the bolts 63, the fixture part 61a is fastened to the junctions 27c.

The frame member 61 is provided with elongated holes 61c through which fittings 47a for hooking an air bag case 47 are inserted.

As for other arrangements, functions and effects, Embodiment 5 is similar to Embodiment 3.

In Embodiment 5, the hinge section 24 is not limited to a structure in which its curved part 34 consists of two curved portions, i.e., first and second curved portions 34a and 34b. Alternatively, the hinge section 24 may be formed by, for example, one curved portion that is approximately U-shaped in cross section.

OTHER EMBODIMENTS

In each of the foregoing embodiments, the air bag door 5 is formed as a seamless type air bag. Alternatively, the air bag door 5 may be of an insertable type in which an opening is formed in the panel main body 1 and the air bag door 5 is inserted into the opening so that the air bag door 5 is engaged therein.

Further, although the description has been made on the supposition that the present invention is applied to the air bag door 5 provided at the panel main body 1 of the instrument panel A in each of the foregoing embodiments, the present invention is not limited to such an application. Alternatively, the present invention may be applicable to the air bag door 5 provided at a steering wheel of a vehicle, for example.

The backup section 27, plate section 20 and extensions 38 do not necessarily have to be vibration welded to the panel main body 1 and door section 17 as in the foregoing embodiments. Alternatively, the back-up section 27, plate section 20 and extensions 38 may be provided with a plurality of through holes (not shown), the panel main body 1 and door section 17 may be integrally formed with weld protrusions (not shown) that pass through the through holes, and ends of the weld protrusions that have been passed through the through holes may be welded to portions of the back-up section 27, plate section 20 and extensions 38 which are located around the through holes.

Furthermore, in each of the foregoing embodiments, the description has been made on the supposition that the first and second curved portions 34a and 34b of the hinge section 24 are extended and then the plate section 20 is pivoted upon deployment of the air bag in an ordinary temperature state in which an ambient temperature is 20° C., for example. However, the present invention is not limited to such an application. The present invention is applicable in a frigid area where a temperature is −30° C., for example. In that case, both the curved portions 34a and 34b might not extend due to the low temperature but the plate section 20 pivots around the second curved portion 34b.

Besides, in each of the foregoing embodiments, although the plate section 20 may be formed so that the extensions 38 are omitted, it is preferable to provide the extensions 38 in order to improve the stiffness of the panel main body 1.

In addition, in each of the foregoing embodiments, the extreme-end-side rib 36a or lateral-end-side ribs 36b of the plate section main body 36 may be omitted.

Moreover, in each of the foregoing embodiments, the thick portion 20a of the plate section 20 may be omitted.

What is claimed is:

1. A vehicle airbag door comprising a door section that is provided at a panel main body and is opened by the activation of an airbag device, wherein the airbag door further comprises a back-up member provided on the bottom side of the panel main body, wherein the back-up member comprises:

a back-up section having a shooting aperture through which an airbag expands into a cabin;

a plate section located within the shooting aperture; and a hinge section through which the back-up section and the plate section are integrally connected, wherein the back-up section, the plate section and the hinge section are integrally formed, wherein a gap is formed between an outer edge of the shooting aperture and the plate section, wherein the back-up section is welded to the bottom face of the panel main body at a portion thereof located around and outwardly of the door section, wherein the plate section is welded to the bottom face of the door section, wherein the back-up section is provided with a concave that is recessed away from the door section with the concave being adjacent to the hinge section, wherein the hinge section comprises:

a first curved portion in which one end of the first curved portion is integrally connected to the back-up section, and a midsection of the first curved portion is curved so as to protrude toward the door section; and a second curved portion in which one end of the second curved portion is integrally connected to the other end of the first curved portion, the other end of the second curved portion is integrally connected to the plate section, and a midsection of the second curved portion is curved so as to protrude away from the door section, wherein when the door section is opened, the first and second curved portions of the hinge section are each extended and then the plate section is pivoted around its junction with the second curved portion, and wherein a rupturable groove that is provided on the bottom side of the panel main body, and is ruptured during deployment of the air bag, faces the back-up section.

2. The vehicle airbag door of claim 1, wherein the shooting aperture has an approximately rectangular shape, and corners of the shooting aperture are each formed to have a curved surface, wherein the hinge section is provided to extend along one side of the shooting aperture, wherein the plate section comprises:

a plate section main body integrally connected to the hinge section; and extensions that are located outwardly of both longitudinal ends of the hinge section, integrally extended from the plate section main body to the vicinities of the corners of the shooting aperture, and welded to the bottom face of the door section, and wherein the gap is formed to continuously extend from between the extensions and the outer edge of the shooting aperture to between the extensions and both the longitudinal ends of the hinge section.

3. A vehicle airbag door comprising a door section that is provided at a panel main body and is opened by the activation of an airbag device, wherein the airbag door further comprises a back-up member provided on the bottom side of the panel main body, wherein the back-up member comprises:

a back-up section having an approximately rectangular shooting aperture through which an airbag expands into a cabin;

a plate section located within the shooting aperture; and a hinge section which is provided to extend along one side of the shooting aperture and through which the back-up section and the plate section are integrally connected, wherein the back-up section, the plate section and the hinge section are integrally formed, wherein a gap is formed between an outer edge of the shooting aperture and each of the outer periphery of the plate section and both longitudinal ends of the hinge section, wherein the back-up section is welded to the bottom face of the panel main body at a portion thereof located around and outwardly of the door section, wherein the plate section is welded to the bottom face of the door section, and wherein the back-up section is provided with a concave that is recessed away from the door section with the concave being adjacent to the hinge section, and wherein the hinge section comprises:

a first curved portion in which one end of the first curved portion is integrally connected to the back-up section, and a midsection of the first curved portion is curved so as to protrude toward the door section;

a second curved portion in which one end of the second curved portion is integrally connected to the other end of the first curved portion, the other end of the second curved portion is integrally connected to the plate section, and a midsection of the second curved portion is curved so as to protrude away from the door section; and ribs that are integrally formed with the hinge section at the bottom face of the first and second curved portions which are opposite to the door section and in the vicinities of both longitudinal ends of the first and second curved portions and across the first and second curved portions and wherein a rupturable groove that is provided on the bottom side of the panel main body, and is ruptured during deployment of the air bag, faces the back-up section.

4. The vehicle airbag door of claim 3, wherein the plate section comprises:

a plate section main body integrally connected to the hinge section; and extensions that are located outwardly of both the longitudinal ends of the hinge section, integrally extended from the plate section main body to the vicinities of corners of the shooting aperture, and welded to the bottom face of the door section, wherein the gap is formed to continuously extend from between the extensions and the outer edge of the shooting aperture to between the extensions and both the longitudinal ends of the hinge section, and wherein the ribs are formed continuously from the hinge section to the extensions of the plate section.

* * * * *

UNITED STATES PATENT AND TRADEMARK OFFICE
CERTIFICATE OF CORRECTION

| | | |
|---|---|---|
| PATENT NO. | : 7,178,825 B2 | Page 1 of 1 |
| APPLICATION NO. | : 10/684188 | |
| DATED | : February 20, 2007 | |
| INVENTOR(S) | : Mutsuo Fujii et al. | |

It is certified that error appears in the above-identified patent and that said Letters Patent is hereby corrected as shown below:

Title Page;

Section (56)

"DE 199 984 A1" should read--DE 199 40 984 A1--

Signed and Sealed this

Twenty-fifth Day of December, 2007

JON W. DUDAS
*Director of the United States Patent and Trademark Office*